United States Patent

[11] 3,607,069

[72] Inventors Charles Patrick Bruen
 Fayetteville, N.Y.;
 Donald Hoyt Kelly, Gladstone, N.J.;
 Christian Albert Wamser, Camillus;
 Bhaskar Bandyopadhyan, Liverpool, N.Y.
[21] Appl. No. 883,651
[22] Filed Dec. 9, 1969
[45] Patented Sept. 21, 1971
[73] Assignee Allied Chemical Corporation
 New York, N.Y.

[54] PROCESS FOR RECOVERING SULFUR AND METAL VALUES FROM SULFUR-BEARING MINERALS
 15 Claims, 1 Drawing Fig.
[52] U.S. Cl. ................................................. 23/225,
 23/130, 23/181, 75/101, 260/429 J
[51] Int. Cl. ......................................................... C01b 17/06
[50] Field of Search ........................................... 23/224–225,
 227, 181, 130; 260/439, 429 J;
 75/101, 121

[56] References Cited
UNITED STATES PATENTS

| | | | |
|---|---|---|---|
| 3,068,065 | 12/1962 | Hartley et al. ................ | 23/225 X |
| 3,077,488 | 2/1963 | Mercier et al. ................ | 23/225 X |
| 3,115,511 | 12/1963 | Singer et al. ................... | 260/439 |
| 3,511,645 | 5/1970 | Goni............................. | 75/101 |

*Primary Examiner*—Oscar R. Vertiz
*Assistant Examiner*—G. O. Peters
*Attorneys*—Gerard P. Rooney and Albert L. Gazzola ABSTRACT: A process for recovering sulfur values and concentrating other metal values from pyrrhotite (FeS) by complexing ferrous sulfide in aqueous medium with an insoluble alkylamino polycarboxylic acid chelating agent to form a water-soluble ferrous chelate, hydrogen sulfide and a concentrate of insoluble sulfides of nonferrous metals. The hydrogen sulfide is reacted Claus sulfur dioxide under conventional Clause reaction conditions to yield sulfur. The ferrous chelate, in solution, is treated with an oxygen-free sulfur dioxide whereby the water-insoluble chelating agent is regenerated for recycle. The solution of ferrous bisulfite which forms is processed to yield additional quantities of sulfur dioxide from which sulfur is recovered.

PATENTED SEP 21 1971 3,607,069
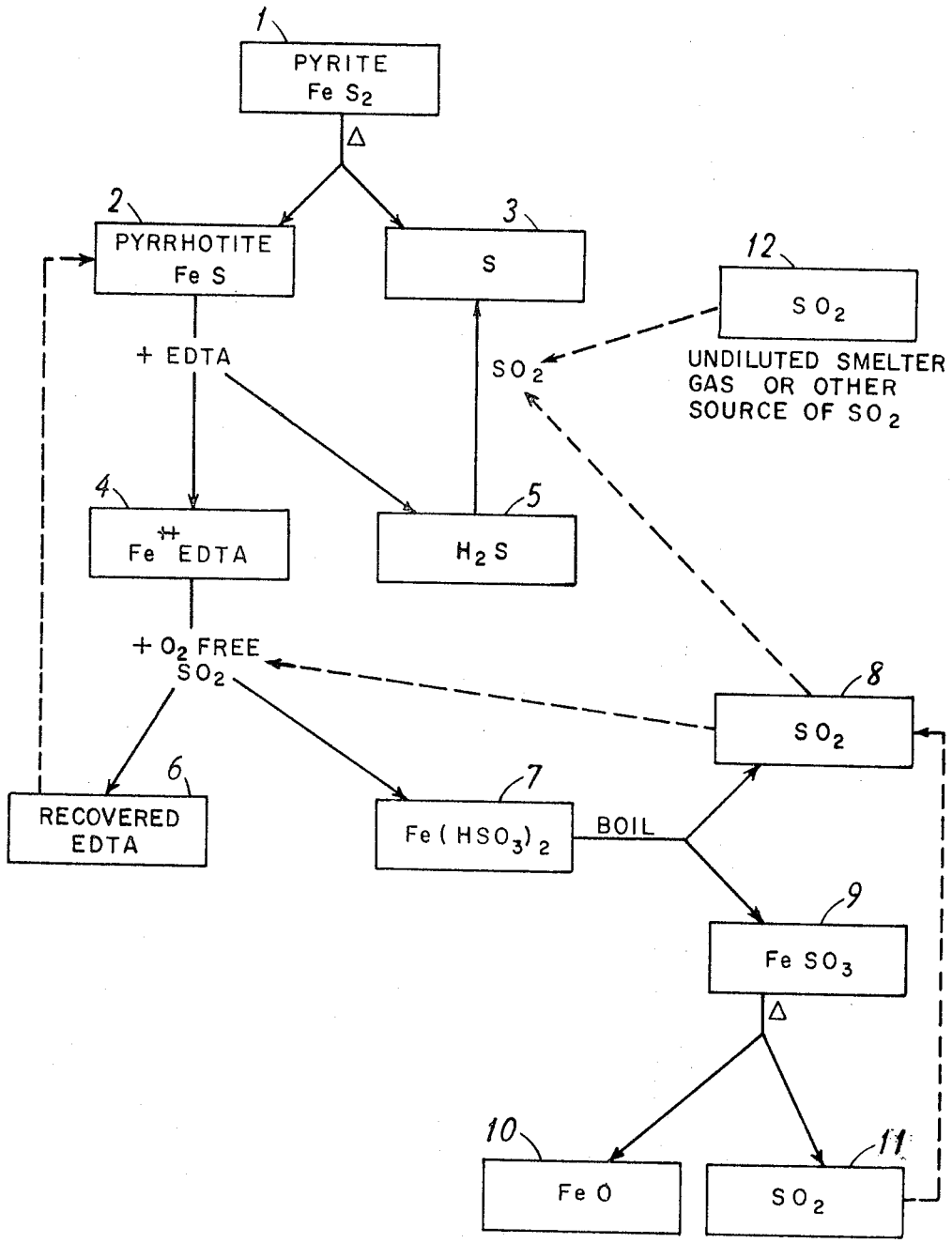
INVENTORS
CHARLES P. BRUEN
DONALD H. KELLY
CHRISTIAN A. WAMSER
BHASKAR BANDYOPADHYAY
BY *Albert Gaggolo*
AGENT

PROCESS FOR RECOVERING SULFUR AND METAL VALUES FROM SULFUR-BEARING MINERALS

BACKGROUND OF THE INVENTION

It is known to recover sulfur by the process of roasting pyrite ore in a shaft furnace or a fluidized bed reactor at temperatures of from 650°–800° C., in the presence of a reducing agent, wherein the sulfur dioxide produced under this reducing atmosphere is converted to sulfur. This roasting process is used not only to recover sulfur, but also to recover metal values which may be present in pyrite ores. A process such as this is disclosed in U.S. Pat. No. 2,869,999. The use of the roasting process to reduce sulfur from pyrite requires extremely high temperatures over long periods and concomitantly high cost and operating difficulties. As a consequence, for economic reasons pyrite, $FeS_2$, has been decomposed by thermal desulfurization to recover only half the sulfur values. A process such as this, in which pyrite is converted to pyrrhotite (essentially FeS) and sulfur, is an established process and is documented in detail in "A Comprehensive Treatise in Inorganic Chemistry," J. W. Mellor, volume XIV, page 213.

The use of water insoluble alkylamino polycarboxylic acid chelating agents for recovering sulfur from pyrrhotite was not known before this invention. It has been found that the ferrous iron in pyrrhotite complexes readily with the insoluble alkylamino polycarboxylic acid chelating agent in the process of the present invention, to form hydrogen sulfide, which is then converted to sulfur, and a soluble ferrous complex from which the insoluble chelating agent may be readily regenerated with sulfur dioxide for reuse. An added feature of this invention is that both the pyrite and pyrrhotite ores, and waste $SO_2$ gases, which are used in the process of this invention generally are readily available where the invention is to be practiced, such as a copper smelter. Furthermore, because of the substantial total recovery of all of the sulfur in the pyrite ores and of the ancillary utilization of the smelter gas in the process of this invention, which would normally be exhausted to the atmosphere, the incidence of air pollution by this recovery process is reduced.

SUMMARY OF THE INVENTION

The process of the present invention relates to the recovery of sulfur from pyrrhotite, which is essentially ferrous sulfide (FeS). The pyrrhotite used in the present process may be derived from the thermal desulfurization of pyrite ($FeS_2$) or from pyrrhotite ore. The above desulfurization reaction may be conducted in a flying bed pyrite desulfurizing unit usually operating at a linear gas flow rate at 5 feet/second. The present process comprises the utilization of one or more of the following steps:

a. complexing the ferrous sulfide in aqueous medium with a water-insoluble alkylamino polycarboxylic acid chelating agent to form a solution containing the ferrous chelate of the acid, hydrogen sulfide ($H_2S$) and a precipitate of concentrated nonferrous metals;

b. conversion of the evolved $H_2S$ to sulfur by reaction with sulfur dioxide-containing gas (Claus reaction);

c. recovery of the chelating agent by treating the solution of ferrous chelate with an amount of an oxygen-free sulfur dioxide to form the chelating agent and a solution of ferrous bisulfite, under acidic conditions;

d. Heating the ferrous bisulfite solution to produce sulfur dioxide (oxygen-free) which may be used in (c) above, and a precipitate of ferrous sulfite, and pyrolyzing the ferrous sulfite to produce additional oxygen-free sulfur dioxide and ferrous oxide.

DETAILED DESCRIPTION OF THE INVENTION

The pyrrhotite product (FeS) from the thermal desulfurization of pyrite ($FeS_2$) containing small quantities of nonferrous metals such as copper, molybdenum and silver, is digested in aqueous medium with an amount of a water insoluble alkylamino polycarboxylic acid chelating agent, to produce a soluble ferrous chelate, liberate hydrogen sulfide and precipitate the nonferrous metals. The amount of chelating agent is that required to react stoichiometrically with the ferrous sulfide in the solution. While more or less than a stoichiometric quantity of chelating agent may be used, it is not preferred. The chelating agent preferably is added incrementally for best results. This, to obtain complete solubility of the ferrous chelate, it is preferred to start with a slurry of the ferrous sulfide (pyrrhotite) in water; then the theoretical amount of chelating agent is added to produce a 5–8 percent suspension of the chelating agent and preferably 7 percent, with thorough mixing. The chelating agent dissolves only to the extent that it reacts with the pyrrhotite to form the soluble ferrous complex. The reaction may be demonstrated using EDTA as follows:

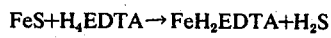

$$FeS + H_4EDTA \rightarrow FeH_2EDTA + H_2S$$

The ferrous iron in the ferrous chelate complex is sensitive to oxidation to the ferric state. This oxidation must be avoided because although the chelate may be regenerated from the ferrous complex with $SO_2$, as will be described in more detail below, it is not possible to regenerate the free chelate from the ferric complex by the action of $SO_2$. For this reason, it is preferred to conduct the chelation step of this reaction in the absence of oxygen or an oxidizing agent to avoid any significant amount of oxidation. This chelating step may be conducted in the presence of a reducing agent, such as sodium hydrosulfite or sodium formaldehyde sulfoxylate, added intermittently during chelating as required to maintain the iron in the ferrous state, as indicated by the discharge of the red color of the ferric compound.

The complexing of the insoluble pyrrhotite with the insoluble chelating agent may be conveniently conducted at temperatures above 20° C. up to the boiling point of the solution and preferably between 70° C. and the boiling point of the aqueous solution. It may be conducted at the boiling temperature with good yields. The reaction is carried out in a vessel having a capacity to accommodate the reactants and water necessary for suspending the reactants and for dissolving the ferrous chelate complex.

While sub- or superatmospheric pressures may be employed, the chelating step preferably is conducted at atmospheric pressures up to about 50 p.s.i.g., since this avoids the use of pressure-type equipment.

Only water-insoluble alkylamino polycarboxylic acid chelating agents are operable in this invention. In addition to being water insoluble, the chelating agent must be capable of forming a water soluble ferrous iron complex, in order to be operable in this invention. Generally, chelating agents having an alkyl constituency of about up to 4 carbon atoms and about up to 4 carbon atoms in each of the polycarboxylic acid moieties, form water-soluble complexes and are considered operable in this invention. Chelating agents such as ethylenediaminetetraacetic acid (EDTA), ethylenediaminetetrapropionic acid (EDTP) and nitrilotriacetic acid (NTA) are operable in this invention. EDTA because of its widespread availability, high acidity (high value acid dissociation constant) and high ferrous chelate stability constant (high value stability constant) is preferred.

Water soluble alkylamino polycarboxylic acid chelating agents such as N-hydroxyethylethylenediaminetriacetic acid (HEDTA) and ethylenediaminediproprionic acid (EDDP), because of their solubility, are not recoverable from aqueous solution by precipitation and are not desired in the operation of this invention. Although they do complex with ferrous iron and liberate $H_2S$ from FeS, since they would not be recoverable for reuse the cost of the process would become prohibitive.

Other insoluble metal sulfides such as those of copper and molybdenum, CuS and $MoS_2$, contained in the pyrrhotite are not reactive and do not dissolve in the aqueous solution of ferrous chelate. They are separated from the ferrous iron and concentrated in this step. Silver and gold may also be present in the residue as sulfides. These concentrated metal values are stockpiled for subsequent recovery by known methods of roasting, leaching and selective precipitation of the concentrated metals from the leach solutions. The concentration of these economically important metals which facilitates their recovery, is an ancillary advantage of this process.

The hydrogen sulfide liberated during the chelating step of the present inventive process is reacted with an $SO_2$-containing gas to produce elemental sulfur by the well-known Claus reaction, as described in the Encyclopedia of Chemical Technology, Kirk Othmer, volume 13, page 367. The reaction proceeds as follows:

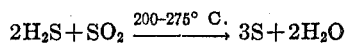

$$2H_2S + SO_2 \xrightarrow{200-275°\ C.} 3S + 2H_2O$$

The reaction is conducted in the presence of a catalyst, such as alumina, bauxite, quartz, and the like. The sulfur dioxide used in this reaction may be derived from substantially undiluted smelter gas from the combustion of pyrite, or from oxidative roasting of sulfide ores. If the smelter gas is allowed to become diluted with air or oxygen as it is collected from a copper smelter, it is rendered less useful as a source of sulfur dioxide in this reaction. Substantially undiluted smelter gas containing less than 1 to 2 percent air is operable in this step, the less dilute being preferred. Other sources of sulfur dioxide to produce additional elemental sulfur are available from subsequent reactions as indicated below.

The water-insoluble chelating agent is recovered from the ferrous chelate complex in substantially quantitative yields by treating the aqueous chelate solution, preferably at room temperature, with sulfur dioxide in an amount sufficient to maintain an acid medium having a pH of about 1.0 to 2.0 and preferably about 1.5. The chelating agent precipitates in substantially pure form in the shape of needles. Temperatures of about 50° C. or lower may be used, but room temperature is preferred. As the temperature is increased above room temperature, the solubility of the chelating agent increases and the solubility of $SO_2$ decreases with corresponding lower recoveries of chelating agent. Therefore, elevated temperatures above room temperature are not preferred.

In this reaction, as well, for best results, oxygen must be substantially excluded to prevent oxidation of the ferrous chelate to the ferric chelate. Overall, the reaction proceeds as follows:

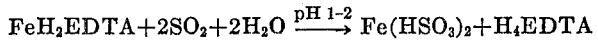

$$FeH_2EDTA + 2SO_2 + 2H_2O \xrightarrow{pH\ 1-2} Fe(HSO_3)_2 + H_4EDTA$$

The precipitated chelate is separated from the aqueous solution containing essentially dissolved ferrous bisulfite, and recycled to complex additional ferrous sulfide as described above. It may be reused as a wet cake or in a dried state.

Additional $SO_2$ may be recovered from the ferrous bisulfite solution by boiling the solution and driving off the $SO_2$ and precipitating ferrous sulfite. More sulfur dioxide may be recovered by heating the precipitated ferrous sulfite at about 200–210°C.

The solution, after separating off the ferrous sulfite, may be further treated with $SO_2$ to insure maximum precipitation of the chelating agent. After filtering off the additional insoluble regenerated chelating agent, if any, the filtrate may again be boiled to recover $SO_2$ and additional ferrous sulfite as before. This unique cyclic process of alternatively precipitating the metal sulfite and the complexing agent may be repeated to increase the accumulative recovery of chelating agent. The sulfur dioxide regenerated by decomposing ferrous bisulfite and from pyrolysis of ferrous sulfite, may be divided between the Claus reactor and the chelate regenerator. Additional sulfur dioxide, if needed, may be tapped from a source of substantially undiluted smelter gas.

The ferrous oxide residue from the pyrolysis of ferrous sulfite, may be used in metallurgical processes such as in the production of steel, pig iron and similar products.

As is seen from the above description, the process of this invention is self-contained. However, although substantially all of the chelating agent is recovered and reused, not all is recovered. Additional chelating agent must be added from time to time to make up for that which is not recovered and slight mechanical losses incurred as a consequence of repeated use.

The benefits derived from the process of this invention are many. Substantially all of the sulfur in the desulfurized pyrite is recovered under comparatively mild conditions. The expensive chelating agent is substantially all recovered from the ferrous complex and recycled, thereby rendering the process economically feasible. The sulfur dioxide used for regenerating the chelate is recoverable from the ferrous bisulfite product. Additionally, valuable metals such as copper, molybdenum and silver are concentrated in the residue remaining from the preparation of the ferrous chelate complex above. These residues may be collected and the concentrated metals recovered and separated by conventional known methods.

Referring to the attached chart depicting an overall embodiment using ethylenediaminetetraacetic acid (EDTA), pyrite is thermally desulfurized—1 into ferrous sulfide 2 and sulfur 3. The sulfur is recovered and the sulfide is treated with EDTA to yield a soluble ferrous EDTA chelate 4 and hydrogen sulfide 5. The hydrogen sulfide is reacted with $SO_2$ under reaction conditions to yield additional sulfur 3. The ferrous EDTA chelate 4 is treated with an oxygen-free sulfur dioxide gas to precipitate regenerated EDTA 6 which is collected and recycled to step 2. The ferrous bisulfite solution 7 which forms, is boiled to yield sulfur dioxide 8 and a precipitate of ferrous sulfite 9. The ferrous sulfite 9 is collected and pyrolyzed to yield ferrous oxide 10 and additional sulfur dioxide 11. The sulfur dioxide products in 11 and 8 are collected for use in converting hydrogen sulfide 5 to sulfur or in regenerating the EDTA 4. Additional sulfur dioxide 13 must be provided to satisfy the total requirements for converting hydrogen sulfide to sulfur and regenerating EDTA.

The following example is intended to illustrate a specified embodiment utilizing the present invention and is not intended to limit the invention thereto.

EXAMPLE 2.2 parts of desulfurized pyrite containing 34.6 percent sulfur is added to a reaction vessel containing 100 parts of water maintained at about 100° C. While stirring the mixture the stoichiometric amount (7.3 parts) of ethylenediaminetetraacetic acid (EDTA) is added. The hydrogen sulfide liberated during the complexing of ferrous iron with EDTA amounts is 0.78 parts in 2 hours. This hydrogen sulfide product is reacted with the sulfur dioxide in undiluted smelter gas at 250° C. in the Claus reaction to produce elemental sulfur. The reaction mixture is then filtered to collect 0.11 parts of residual solid containing concentrated metal values such as copper, molybdenum, etc. This residual solid from each run is stockpiled for subsequent extraction of the metal values. The filtrate containing the ferrous EDTA is then treated with sufficient oxygen-free sulfur dioxide in an agitated vessel at 29° C. for 4 hours to regenerate the bulk of the EDTA. The pH of the solution maintains at about 1.5 during the reaction. The EDTA precipitated amounts to 7 parts after drying.

The filtrate after filtering off the insoluble EDTA is boiled for about 10 minutes yielding a precipitate of ferrous sulfite and additional sulfur dioxide for recycle.

By this procedure 97.2 percent of EDTA is recovered. Also from the estimated sulfur content of the pyrite, over 99 percent sulfur in pyrite is recovered.

Having thus described our invention, we claim:

1. A process for separating sulfur from a ferrous sulfide ore which comprises reacting said ferrous sulfide in aqueous medium with an amount of a water-insoluble alkylamino polycarboxylic acid chelating agent sufficient to effect formation of a water soluble ferrous chelate of said agent and hydrogen sulfide.

2. The process of claim 1 wherein said reaction is effected at a temperature of about 20° C. to the boiling point of the aqueous reaction mixture.

3. The process of claim 1 wherein the chelating agent contains about up to 4 carbon atoms in the alkyl moiety.

4. The process of claim 1 wherein the chelating agent contains about up to 4 carbon atoms in the polycarboxylic acid moiety.

5. The process of claim 1 wherein the chelating agent is ethyenediaminetetraacetic acid.

6. The process of claim 1 wherein the chelating agent is nitrilotriacetic acid.

7. The process of claim 1 wherein the hydrogen sulfide product is reacted with sulfur dioxide under conditions sufficient to effect production of elemental sulfur.

8. A method of processing a ferrous sulfide ore which comprises the steps of:
   a. reacting said ferrous sulfide in aqueous medium with an amount of a water-insoluble alkylamino polycarboxylic acid chelating agent sufficient to effect formation of a water soluble ferrous chelate and byproduct hydrogen sulfide;
   b. reacting said ferrous chelate solution with a substantially oxygen-free, sulfur dioxide containing medium at a pH of about 1 to 2 and in an amount sufficient to regenerate said water-insoluble alkylamino polycarboxylic chelating agent and form an aqueous solution of ferrous bisulfite; and
   c. separating said chelating agent from the bisulfite solution.

9. The process of claim 8 wherein the aqueous solution of ferrous bisulfite from step (c) is heated to a temperature sufficient to produce sulfur dioxide and ferrous sulfite and the ferrous sulfite is heated at a temperature sufficient to desulfurize said ferrous sulfite to produce ferrous oxide and sulfur dioxide.

10. The process of claim 9 wherein the sulfur dioxide formed is reacted with hydrogen sulfide under conditions sufficient to effect production of elemental sulfur.

11. The process of claim 9 wherein the sulfur dioxide formed is used to regenerate the alkylamino polycarboxylic chelating agent from the ferrous complex.

12. The process of claim 8 wherein the regenerated insoluble alkylamino polycarboxylic chelating agent separated in step (c) is recycled to step (a) for reaction with ferrous sulfide.

13. A process for recovering a water-insoluble alkylamino polycarboxylic acid from an aqueous solution of the soluble ferrous chelate of said acid which comprises reacting said ferrous chelate solution with a substantially oxygen-free sulfur dioxide at a pH of about 1 to 2 and in an amount of said sulfur dioxide sufficient to effect conversion of the ferrous chelate to the insoluble free acid and ferrous bisulfite in solution and recovering said insoluble acid from said solution.

14. A process as in claim 13 wherein the ferrous bisulfite solution is heated to release sulfur dioxide and precipitate ferrous sulfite and collecting the sulfur dioxide and ferrous sulfite therefrom.

15. A process as in claim 14 wherein further recovery of water-insoluble chelating agent from the resulting solution after removal of the ferrous sulfite, is attained by repeating the cycle of treating said solution with sulfur dioxide and collecting the precipitated chelating agent therefrom.